(12) United States Patent
Chen

(10) Patent No.: US 8,850,791 B2
(45) Date of Patent: Oct. 7, 2014

(54) FLYWHEEL ENGINE

(75) Inventor: Jiubin Chen, Shandong (CN)

(73) Assignee: Jinan Metal Haber Metallurgical Technology Development Co., Ltd, China Railway International Exposition, Jinan High-Tech Development Zone, Jinan, Shandong (CN)

( * ) Notice: Subject to any disclaimer, the term of this patent is extended or adjusted under 35 U.S.C. 154(b) by 1408 days.

(21) Appl. No.: 12/599,288

(22) PCT Filed: Mar. 24, 2008

(86) PCT No.: PCT/CN2008/000574
§ 371 (c)(1),
(2), (4) Date: Nov. 7, 2009

(87) PCT Pub. No.: WO2008/119245
PCT Pub. Date: Oct. 9, 2008

(65) Prior Publication Data
US 2010/0307129 A1    Dec. 9, 2010

(30) Foreign Application Priority Data

| | | |
|---|---|---|
| Mar. 31, 2007 | (CN) | 2007 1 0014136 |
| Apr. 28, 2007 | (CN) | 2007 1 0103689 |
| Apr. 30, 2007 | (CN) | 2007 1 0103630 |
| May 9, 2007 | (CN) | 2007 1 0104365 |
| May 21, 2007 | (CN) | 2007 1 0015616 |
| Oct. 25, 2007 | (CN) | 2007 1 0113519 |
| Nov. 28, 2007 | (CN) | 2007 1 0114684 |
| Dec. 4, 2007 | (CN) | 2007 1 0114856 |
| Dec. 7, 2007 | (CN) | 2007 1 0116118 |
| Dec. 15, 2007 | (CN) | 2007 1 0115992 |
| Dec. 19, 2007 | (CN) | 2007 1 0115750 |
| Jan. 8, 2008 | (CN) | 2008 1 0002562 |

(51) Int. Cl.
*F02C 3/14* (2006.01)
*F02C 3/16* (2006.01)

(52) U.S. Cl.
CPC ................................ *F02C 3/165* (2013.01)
USPC ................................. 60/39.34; 60/39.35

(58) Field of Classification Search
USPC .................. 60/39.34, 39.35; 415/80, 63
See application file for complete search history.

(56) References Cited

U.S. PATENT DOCUMENTS

| | | | | |
|---|---|---|---|---|
| 684,743 | A * | 10/1901 | Burger | 60/39.34 |
| 2,456,417 | A * | 12/1948 | Horsdal | 60/667 |
| 2,544,420 | A * | 3/1951 | Goddard | 60/39.35 |
| 4,024,705 | A * | 5/1977 | Hedrick | 60/39.183 |
| 5,118,250 | A * | 6/1992 | Sagnital et al. | 415/80 |
| 5,282,356 | A * | 2/1994 | Abell | 60/39.35 |
| 6,668,539 | B2 * | 12/2003 | Schlote | 60/39.35 |
| 2006/0230742 | A1 * | 10/2006 | Witteveen | 60/39.35 |

* cited by examiner

*Primary Examiner* — Ehud Gartenberg
*Assistant Examiner* — Vikansha Dwivedi
(74) *Attorney, Agent, or Firm* — Tianhua Gu; Global IP Services

(57) ABSTRACT

A flywheel engine which contains the shell, ignition system, cranking system and fuel system. Install flywheel shaft on shell while at least install a flywheel on the flywheel shaft. Set up gas mixture room on flywheel and open air inlet louver at the central part of the room. Install air cylinder at the peripheral region of flywheel and open jet exhaust at the peripheral region of gas mixture room. Set up admittance port at the bottom of the air cylinder; connect the admittance port and the jet exhaust. Install flame lighter in the air cylinder. The angle of the jet direction of chambers and the radius of flywheel is Φ1.

9 Claims, 9 Drawing Sheets

A-A

FLYWHEEL ENGINE

CROSS REFERENCE TO RELATED PATENT APPLICATIONS

This patent application is the US national stage of PCT/CN2008/000574 filed on Mar. 24, 2008, which claims priorities of the Chinese patent applications No. 200710014136.8 filed on Mar. 31, 2007, No. 200710103689.0 filed on Apr. 28, 2007, No. 200710103630.1 filed Apr. 30, 2009, No. 200710104365.9 filed on May 9, 2007, No. 200710015616.6 filed on May 21, 2007, No. 200710113519.0 filed Oct. 25, 2007, No. 200710114684.8 filed Nov. 28, 2007, No. 200710114856.1 filed Dec. 4, 2007, No. 200710116118.0 filed on Dec. 7, 2007,No. 200710115992.2 filed Dec. 15, 2007, No. 200710115750.3 filed Dec. 19, 2007 and No. 200810002562.4 filed Jan. 8, 2008, which applications are incorporated herein by reference.

FIELD OF THE INVENTION

The present invention which relates to the field of power equipment and thermodynamic equipment is a kind of flywheel engine.

BACKGROUND OF THE INVENTION

The existing methods of thermal energy conversion, the method of thermal energy converts to kinetic energy takes complex structures in which the intermediate links bring about too much energy dissipation and low energy conversion which complicate the equipment manufacturing, rise the equipment cost, set down the capacity usage ratio and result in congenital defects in technology, all these factors make it is hard to break through the technical bottleneck. Manufacturing methods of high temperature and high pressure also confront the problems of achieving higher temperatures and high pressures, and a great variety of materials cannot be produced for this reason.

The existing engines are mainly internal-combustion engine and jet engine. Due to the principle congenital defects of the internal-combustion engines, they have lots of defects such as large weight, low speed of revolution, high energy consumption, large amount of discharges, loud noise, high cost, high maintenance cost, short service life and other defects. Jet engines also have many defects as small thrust force, low jet velocity, high cost, high energy consumption, large discharge of noxious gas, high maintenance cost, and short service life and so on. With complex structures, inter mediate links bring about too much energy dissipation and low energy conversion. With congenital defects of design theory of internal-combustion engines, even the technology is very mature nowadays, it is hard to overcome the difficult problem of the low capacity usage ratio.

The existing equipments which can create high temperature and high pressure environment cannot provide higher temperature and pressure. They also have other defects such as the complexity of the equipments, high energy consumption, high cost and so on. All these defects cause the failure creation of conditions which can be used to manufacture artificial stones and other new materials.

SUMMARY OF THE INVENTION

The present invention provides a flywheel engine which adopts brand new ways of thermal energy conversion. The thermal energy conversion method the present invention based are: using the eddy current which is created by progressive increase of the rotating speed from the center to the periphery to inhale the fuel and air from central eddy current region to the eddy current automatically. The fuel and the air are mixed homogeneously affect by the eddy current while they move from the eddy current to the peripheral region of the eddy current, meanwhile the pressure of the gas mixture is increased. Under the action of the circular motion centrifugal force and the inertia effect, they enter another eddy current to combust while speed is decreasing from the center to the periphery. The eddy current makes a further mixture of the fuel and the air and could make the fuel keep combusting in the center of the eddy current. At the same time, a high temperature and high pressure environment is formed at the center of the eddy current so as to help the fuel to combust more fully.

Therefore, making use of high temperature and high pressure environment could produce all kinds of materials. Simultaneously, high temperature and high pressure can produce high pressure gas. A screw propelled jet stream wind with certain direction and angle with the speed is decreasing from the center to the peripheral region could be formed while making use of the pressure produces by the high pressure gas. The jet stream wind possesses faster jet velocity and jet thrust force. The jet thrust force could further promote the circular motion, and then the circular motion produces torque force. Convert the thermal energy produced by the fuel combustion to torque fore while transform the thermal energy to kinetic energy. Taking advantage of conditions above could manufacture engines which can produce torque force. Adjust the jet angle of the screw propelled jet stream wind can form another screw propelled swirling flow. This screw propelled wind stream can produce both thrust force and torque force; it also possesses faster speed and greater thrust force which finally helps to convert the thermal energy to torque force and thrust force, the thermal energy to kinetic energy. Employ all these methods above could manufacture jet screw propelled engines which can produce both thrust force and torque force.

The longer the radius of circle, the longer the circumference. For this characteristic, when every point in the circle does circular motion around the center of the circle at the same rotating speed, the further the point leaves the center of the circle, the higher linear velocity it will possess. Under the coactions of centrifugal forces, the movement from the center to the peripheral region is changed to an accelerated projectile motion with a certain speed. Once the gas enters the projectile motion area from the center region of the circle, it will move to the peripheral region under the influence of the centrifugal force. Under the coactions of friction between gas particles and movement acceleration, an eddy cyclone is formed with increasing rotating speed from the center to the periphery. This eddy cyclone can produce a force towards the periphery of the eddy current, and this force has acceleration. This force could increase the gas pressure of the periphery of the eddy current so as to give the airflow much faster movement speed while this eddy current could make the particles in the eddy current do relative movement, thereby the fuel and the gas could mix homogeneously. When every point in the circle does circular motion and the resistance is steadily increasing from the center to the periphery, the gas enters the projectile motion area and forms an eddy cyclone with descending rotating speed from the center to the periphery. The eddy cyclone could form and keep existing only when the airflow at the same time does propelling movement along the direction of the rotation axis of the circular motion. Just like the eddy motion of water and airflow movement of tornado, the center of the eddy cyclone possesses faster propelling speed while descending from the center to the periphery. Thus, a tapered frontal surface is formed which gives the airflow faster propelling speed and greater thrust force. The newly entered fuel mixture of this eddy cyclone could automatically enter the center of the eddy current. The fuel burns in the center of the eddy current and generates thermal energy. Owing to the energy dissipation during the process of energy transportation, the energy will be transported to the outward with a retarded velocity of its transport speed. Because of this, the thermal energy will possess a retarded velocity of the transport speed when transporting from the center of the eddy current to the periphery. It increases the descending rotating speed of the eddy cyclone from the center to the periphery, adds the rotating speed of the center of the eddy current relatively, focuses more energy forms a higher temperature and pressure in the center of the eddy current, and reduces the temperature and pressure of periphery of the eddy cyclone. In the eddy current, the fuel could burn more fully which makes the discharges more environmentally friendly and more energy-efficient.

The object of the present invention is to provide a flywheel engine which make use of brand new method of thermal energy conversion to solve the problems exist in the former ones. The capacity usage ratio is higher with fuel burns more fully. The discharge of harmful gas is lessening which makes it more environmentally friendly. It creates high temperature and high pressure environment which brings about conditions that could prepare all kinds of materials. It improves the engine's power output incalculably and simplifies the structure of the engine. In the present invention, by rearranging the jet angles of the air cylinder the engine can output torque force or thrust force.

In order to realize the object said above of the present invention, technical scheme uses are as follows: flywheel engine which includes the shell, ignition system, cranking system and fuel system. Install the flywheel shaft on the shell with at least one flywheel on it. Set up a room for gas mixture and set air inlet louvers at the middle of the room. Install air cylinders at the peripheral region of the flywheel. Set up vent ports at the periphery of the room and open admitting ports at the bottom of the air cylinder and connect the admitting ports and the vent ports. Install the flame lighter on the air cylinder, and then the included angle of the direction of the air cylinder's jet blast and the radius of the flywheel is $\Phi1$. The cross section of the air cylinder shows as a circular form, one end of the inlet pipe of vent ports open to the flywheel's direction of rotation, the other end towards to the tangential direction of the cross section of the air cylinder. Install combustion chamber and jet chamber in the air cylinder, the diameter of the cross section of the jet chamber's air admittance position is smaller than the largest diameter of cross section of the combustion chamber. Air cylinder is the first air cylinder, the central axis of the inner chamber of the first air cylinder is an arc. The air cylinder is the second air cylinder whose central axis of the inner chamber is a curve. Set up upper admitting port in the air cylinder at the superior wall of the bottom and set up under part vent port in gas mixture room at the inferior wall of the periphery region, then connect the upper admitting port and the under part vent port. Set up under part admitting port in the air cylinder at the inferior wall of the bottom and set up upper vent port in gas mixture room at the superior wall of the periphery region, then connect the underpart admitting port and the upper vent port. At the side wall of the gas mixture room locates the side vent port while at the bottom side wall of the air cylinder locates the side admitting port. Set up gas mixture room and sir cylinder at the double sides of the flywheel separately. The upper and the under part air cylinders are located on the double sides of the flywheel. Make under part admitting port at the inferior wall of the upper air cylinder's bottom and open upper admitting port at the superior wall of the underpart air cylinder's bottom. The center of the flywheel is the gas mixture room. Open upper vent port and under part vent port at the superior and inferior wall of its periphery region respectively, then connect the under port admitting port and the upper vent port, upper admitting port and the under part vent port. Install thrust force air cylinder on the flywheel. The included angle of the jet direction of the thrust force air cylinder and the plane that perpendiculars to the flywheel shaft where the flywheel belongs is $\Phi2$.

The advantages of the present invention lie in: It adopts brand new ways of thermal energy conversion, makes full use of circular motion and fluid motion, overcomes the problems that exist in the former engines, consumes less energy during the intermediate links, improve the energy usage ratio, burns the fuel more fully. It could discharge less harmful gases and could be more environmentally friendly. It improves the engine's power output incalculably and simplifies the structure of the engine greatly. It creates high temperature and high pressure environment which brings about conditions that could prepare all kinds of materials. The present invention's merits also include simplified manufacture, low cost, high energy usage ratio, energy-conserving and environment-protective and etc.

DETAIL DESCRIPTION OF THE INVENTION

Figure 1:
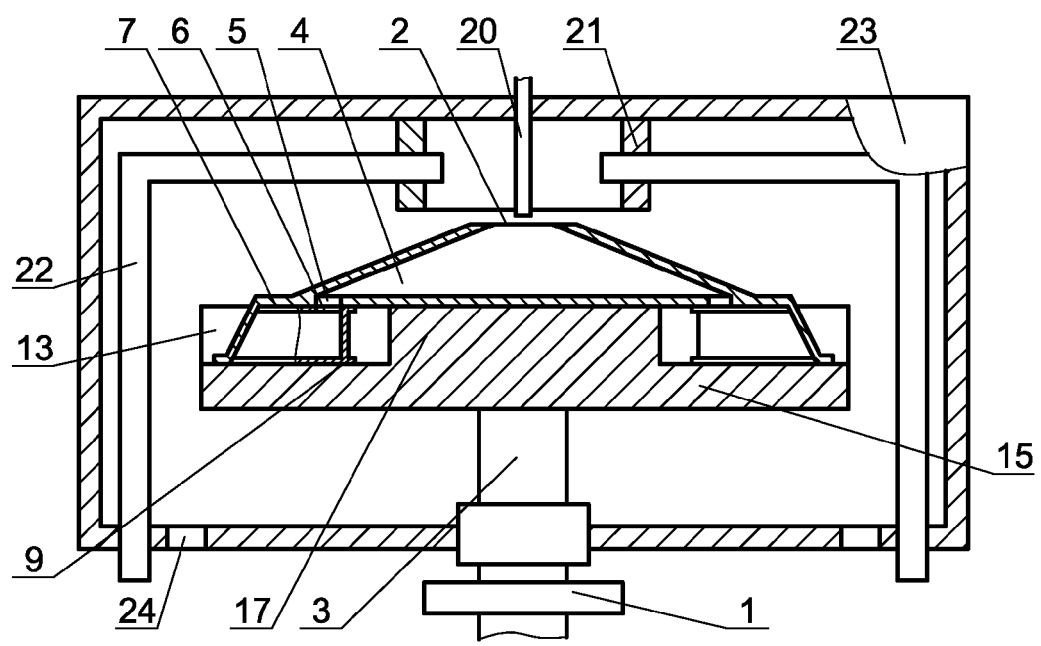
FIG. 1 is the sketch of main visual structure of the first flywheel engine embodiment with single flywheel and one side air cylinder structures of the present invention.

The major structure of the present invention includes shell 23, ignition system, cranking system and fuel system. Shell 23 is the shell of the engine. When the engine is used as thermal equipment, shell 23 could be made into storage hopper or replaced the shell with the storage hopper. An insulating course can be added to the shell 23 so as to decrease the energy loss and reduce the noise. In the inner of shell 23, a stand could be set to stabilize the inner structure. A variety of the engine's supporting facilities can be located on shell 23, set apart accessing opening on shell 23, but seal up it when it is not used.

Open vent 24 and install flywheel shaft 3 on shell 23 while at least install a flywheel 15 on the flywheel shaft 3. Set up gas mixture room 4 on flywheel 15 and open air inlet louver 2 at the middle part of the room. Install gas pipe 22 in shell 23, the exit of gas pipe 22 is within the edge of flywheel 15. Heat collection patches can be installed on gas pipe 22, because of the air admittance direction in gas pipe 22 is opposite to the air exhaust direction, heat at the extreme end when exhausting can be collected by the coldest air. So, after heat can be better used to improve the thermal efficiency. Other air supply methods can also be adopted by the present invention, for example, flywheel shaft 3 could be hollow flywheel shaft, and gas pipe is set in the inner side of it to supply gas to gas mixture room 4. But this method can influence the whole structure of the flywheel, it is not used often. The fuel system has many structures, the most common method is to install fuel pipe 20 on shell 23, and the end of fuel pipe 20 is near air inlet louver 2. Add an atomizing spraying nozzle at the outlet of fuel pipe 20 for the liquid fuel and fuel can be positive delivered by the fuel supply pump. For gas fuel, fuel pipe 20 is set right at air inlet louver 2, fuel can be delivered automatically by its own pressure. Solid fuel can be transported by airflow and through the funnel form fuel port which is set above air inlet louver 2. The rotating speed of the engine and power regulation can be realized by the control of fuel flow. The control valve can be set up, and connect the control valve and the throttle control equipment can control the engine. The fuel system can also transport the fuel through flywheel shaft 3. Flywheel shaft 3 could be hollow flywheel shaft, and the gas pipe is set in the inner side of it to supply gas to gas mixture room 4. But this method can influence the overall performance of the flywheel, so it is not used often. If the flywheel engine is a multi-flywheel structure, then set gas pipe 22 and fuel pipe 20 at every flywheel 15 of every air inlet louver 2. In order to avoid the waste gas entering the engine, install the shielding can 21 on shell 23. The shielding can 21 is near the inside region of the edge of flywheel 15, but can not be contacted with flywheel 15 while gas pipe 22 passes through shielding can 21. Open vent port at the periphery of gas mixture room 4, but the diameter of the air admittance position is smaller than that of the vent position. The central axis of gas mixture room 4 and flywheel 15 are in a straight line, so do the center of air inlet louver 2 and the center axis of flywheel 15. The inner chamber of gas mixture room 4 should be thicker than the central area and the edge should be as thin as possible. Therefore, the gas pressure at the edge of gas mixture room 4 will be further improved. Gas mixture room 4 and flywheel 15 can both be made as one and separate. Flywheel 15 can be deigned as hollowed and make it as gas mixture room 4.

Figure 2:
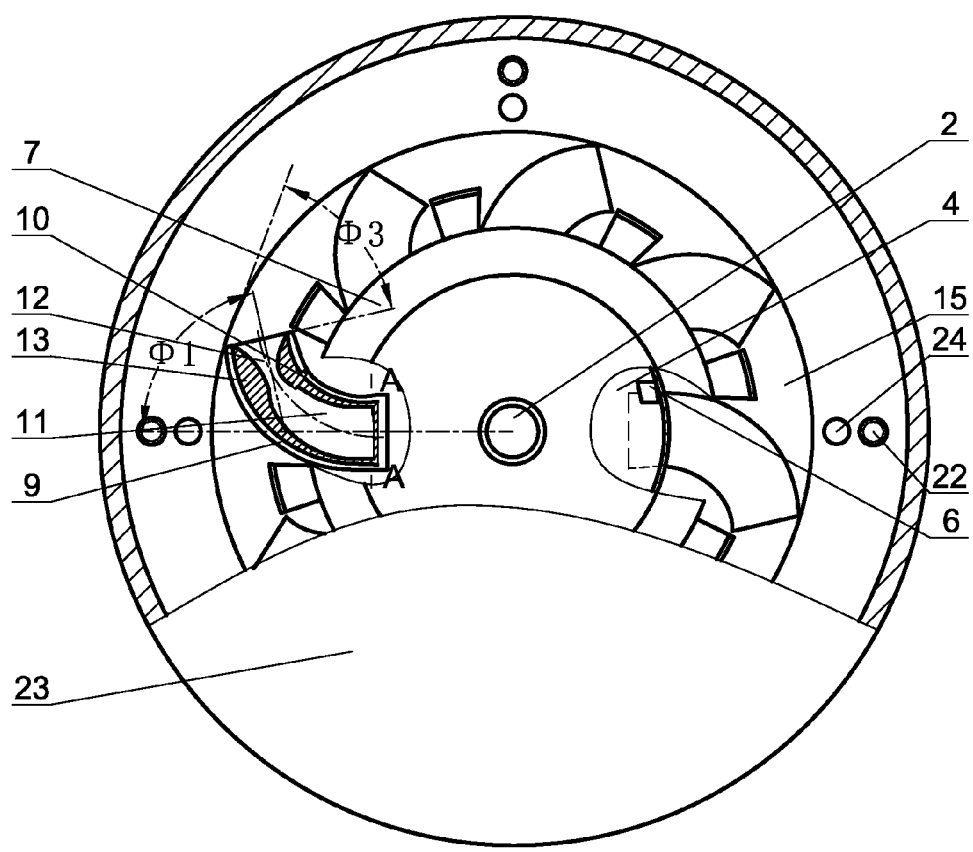
FIG. 2 is a vertical view of drawing 1.
Figure 3:
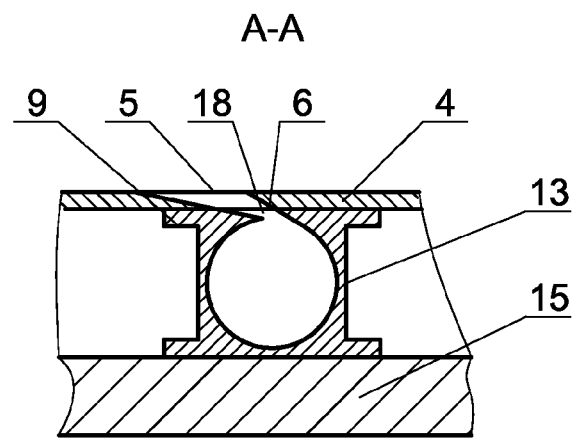
FIG. 3 is the magnified structure diagram of the cross-section drawn along A-A direction of drawing 2.
Figure 4:
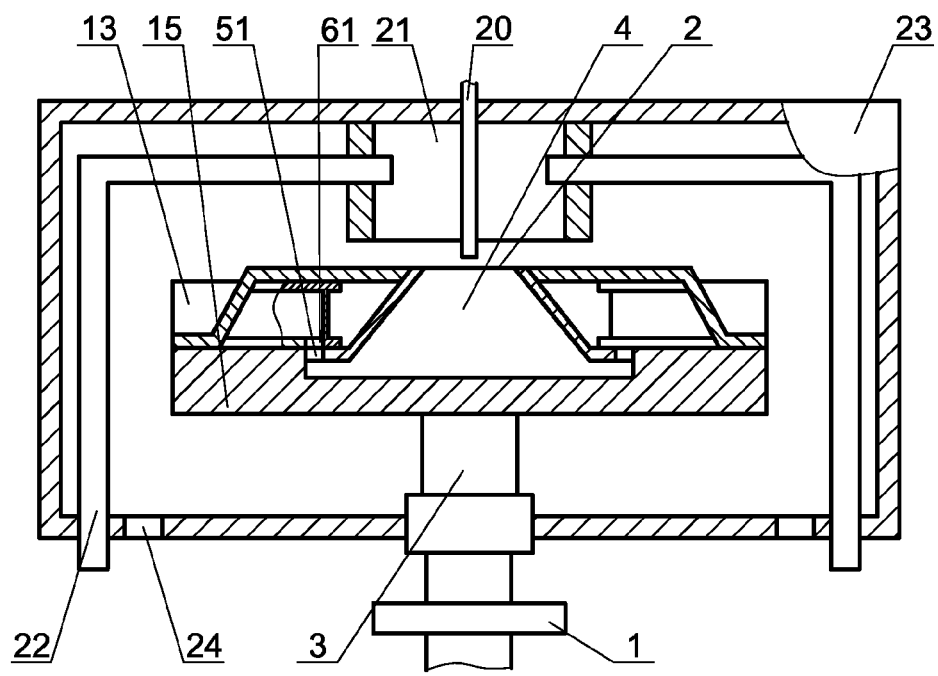
FIG. 4 is the sketch of main visual structure of the second flywheel engine embodiment with single flywheel and one side air cylinder structures of the present invention.
Figure 5:
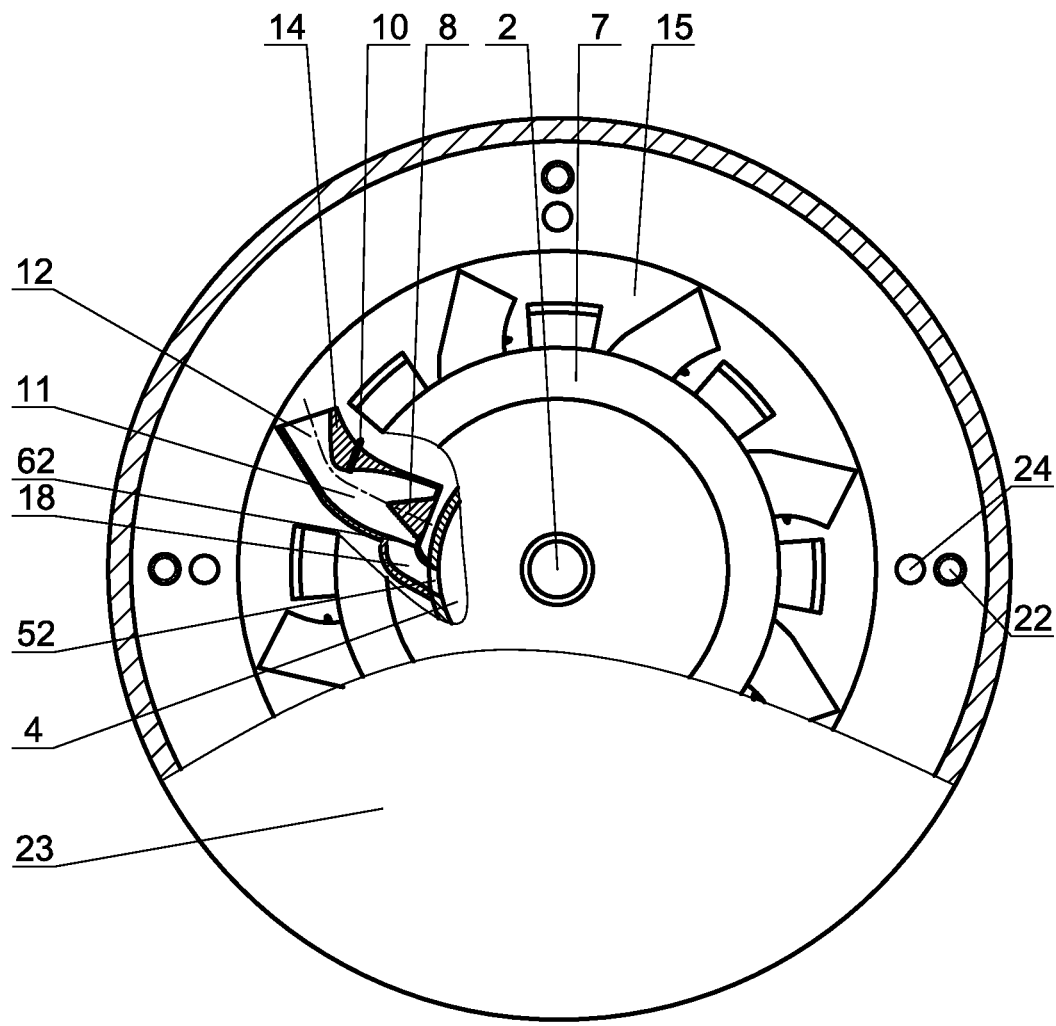
FIG. 5 is the sketch of the vertical view structure of the third flywheel engine embodiment with single flywheel and one side air cylinder structures of the present invention.
Figure 6:
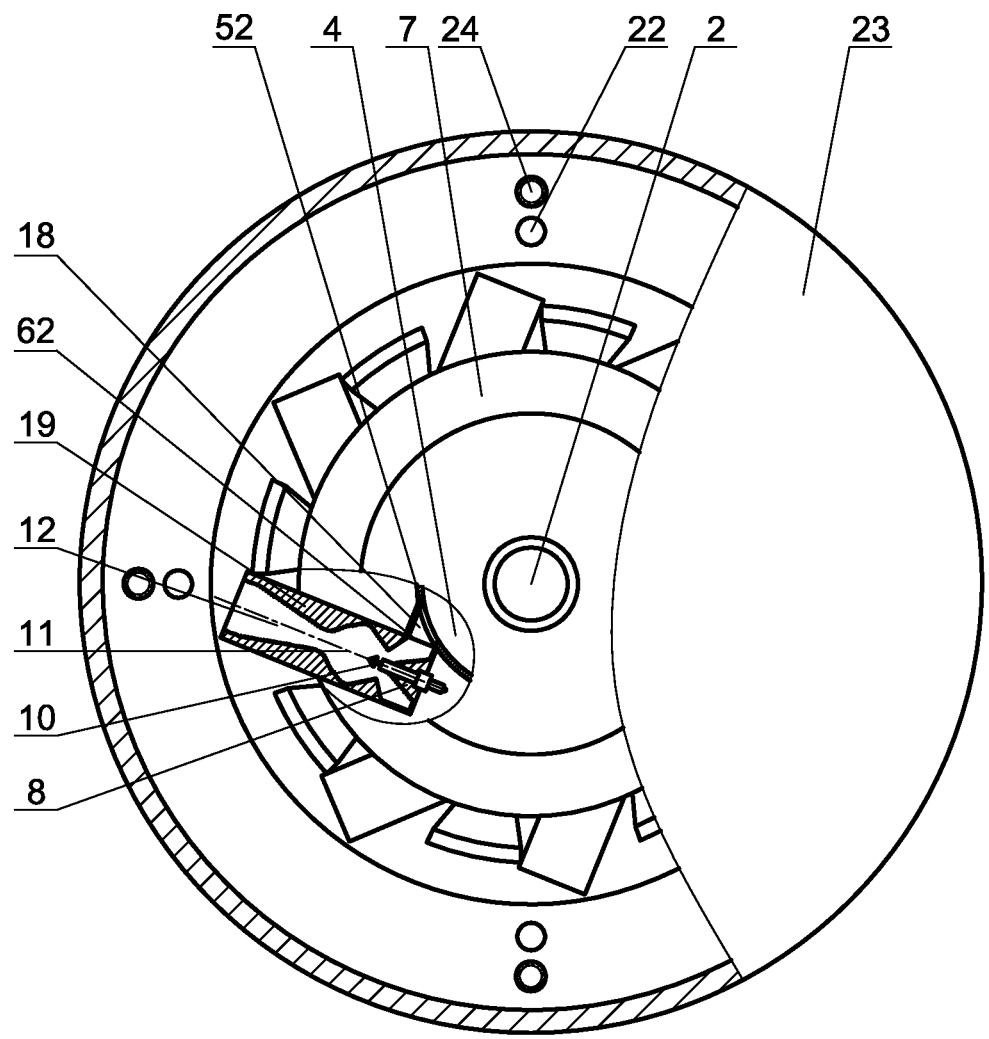
FIG. 6 is the sketch of the vertical view structure of the forth flywheel engine embodiment with single flywheel and single sided air cylinder structures of the present invention.
Figure 7:
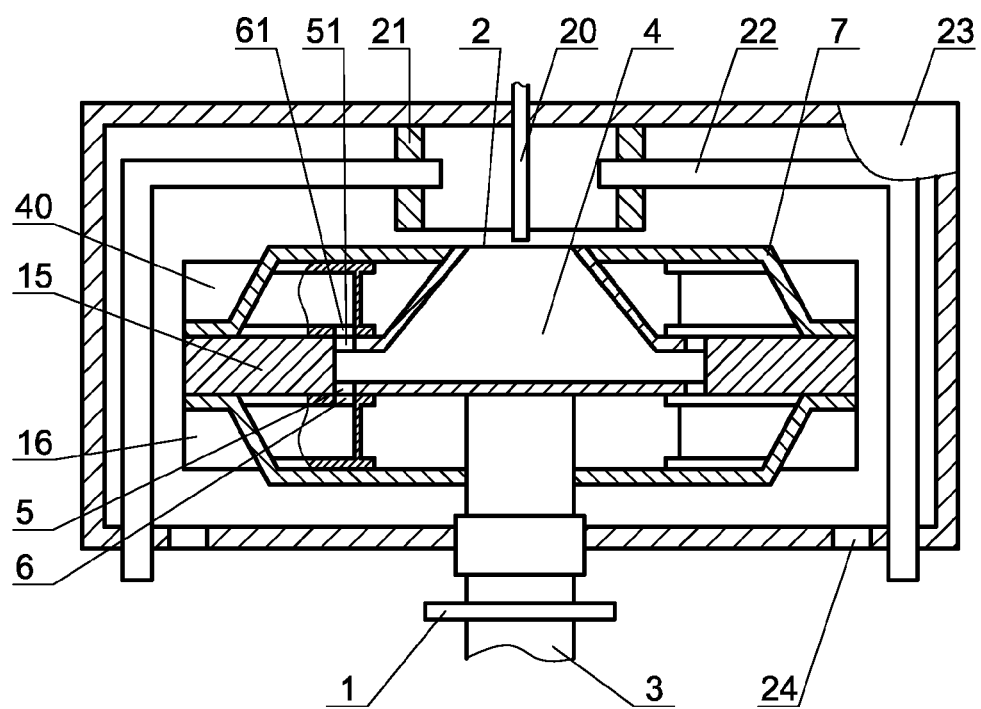
FIG. 7 is the sketch of main visual structure of the flywheel engine embodiment with single flywheel and double sided air cylinder structures of the present invention.
Figure 8:
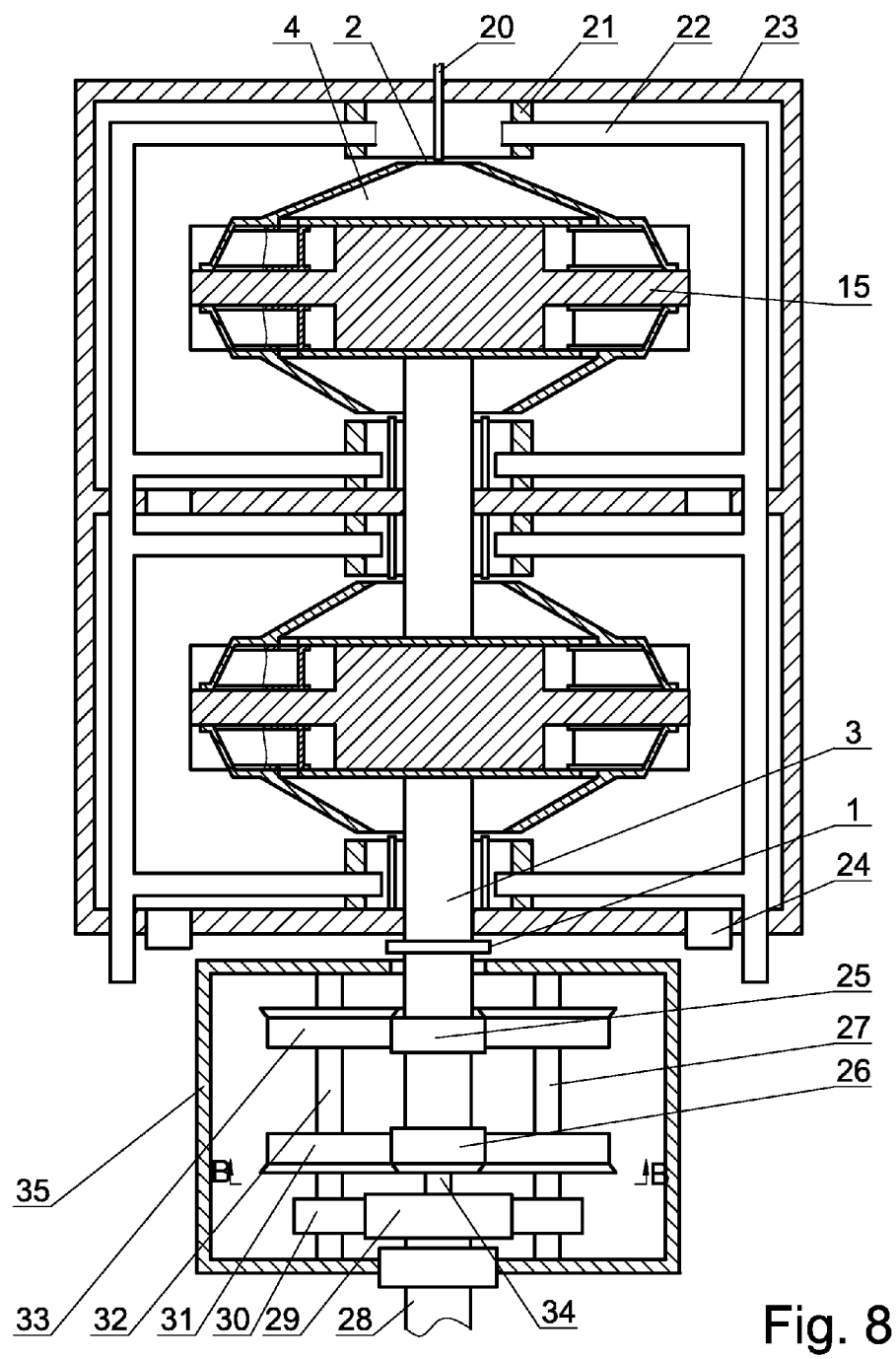
FIG. 8 is the sketch of main visual structure with multi-flywheels structure of flywheel engine of the present invention.
Figure 9:
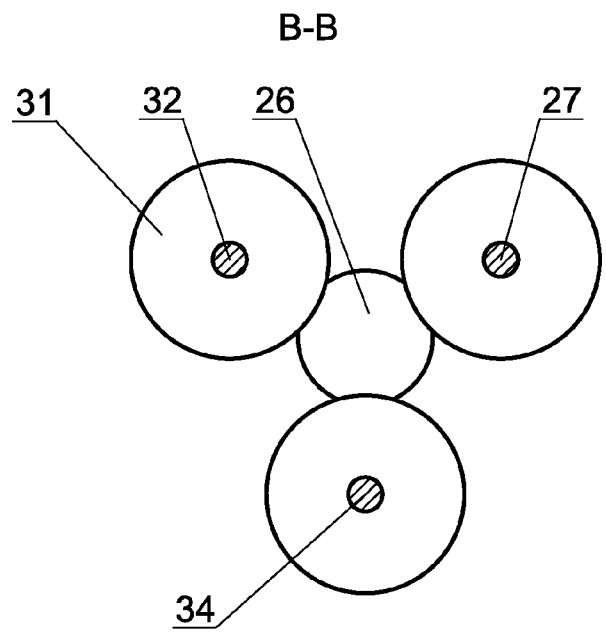
FIG. 9 is the structure diagram of the section view along B-B direction of drawing 8.
Figure 10:
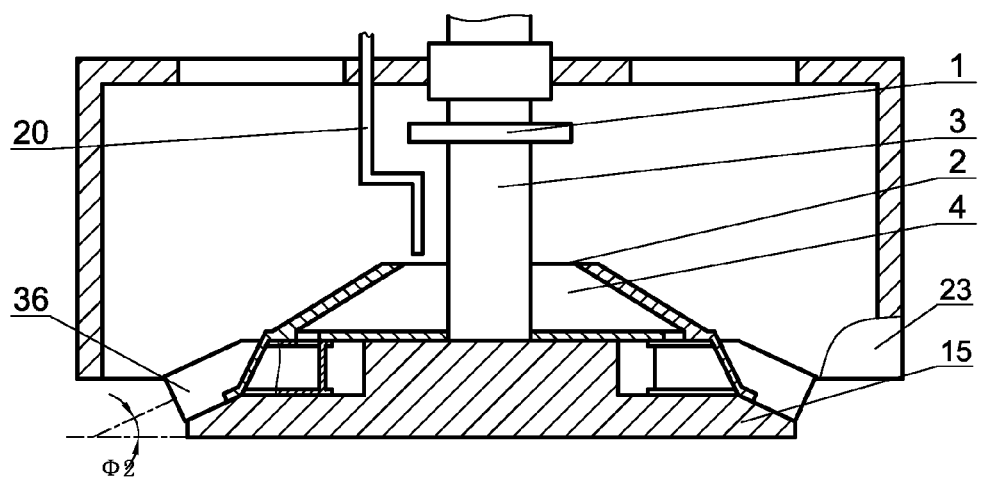
FIG. 10 is the sketch of main visual structure of single sided air cylinder thrust flywheel engine of the present invention.
Figure 11:
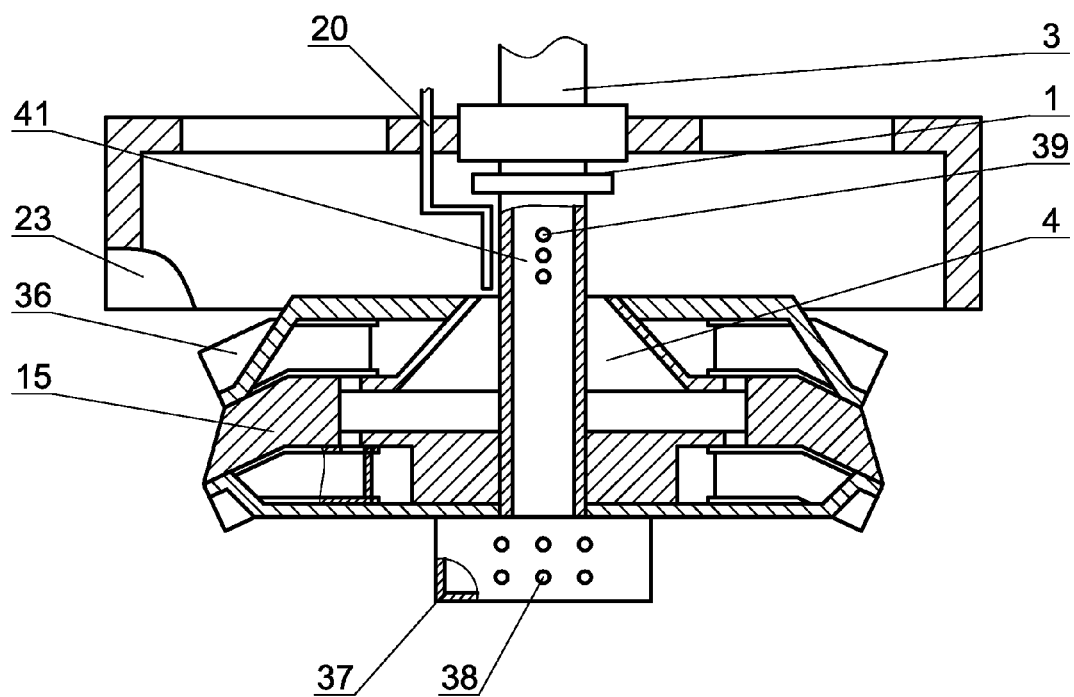
FIG. 11 is the sketch of main visual structure of double sided air cylinder thrust flywheel engine of the present invention.

Install air cylinder at the periphery of flywheel 15 and install more air cylinders as possible on flywheel 15 to improve engine while using the space. If only one air cylinder is installed, flywheel shaft 3 will swing in a circle. This structure is only used under certain conditions. Seal up the bottom of the air cylinder, the cross section of the air cylinder shows as a circular form, open admitting port at the bottom of the air cylinder, connect the admitting port and the vent port of gas mixture room 4. Inlet pipe 18 is set in the vent port, one of its ends opens to flywheel 15's rotating direction and expands the port slantly towards gas mixture room 4. The other end is towards to the tangential direction of the cross section of the air cylinder. Install combustion chamberll and jet chamber 12 in the air cylinder, the diameter of cross section of the air admittance position of jet chamber 12 is smaller than the diameter of combustion chamber 11's cross section. Refer to FIG. 2 the included angle of the direction of the jet chamber 12's jet blast and the horizontal radius of flywheel 15 is $\Phi 1$. $\Phi 1$ is non-zero angle; the best value is between 55.62° to 68.76°.

Combustion chamber 11 is at the bottom of the air cylinder, between combustion chamber 11 and jet chamber 12 is a diminutival nozzle. Jet chamber 12 expands the port with the inner chamber of inside diameter of the air jet direction increases gradually. This could help to improve the jet velocity and the energy usage ratio. It constitutes the air jet part of air cylinder. Inlet pipe 18 open to the top of combustion chamber 11 along the tangential direction of the cross section of the air cylinder, and between combustion chamber 11 and jet chamber 12 is a diminutival nozzle.

Install flame lighter 10 in combustion chamber 11 and could be replaced by sparking plug which could also be replaced by one or two electrodes. While using one electrode, the air cylinder is used as another electrode to ignite a fire. When using two electrodes, they could be installed in the air cylinder at a certain distance which is more suitable to small size engines. Set up foundation beds at the both sides of the air cylinder. Lines in the inner wall of the air cylinder must be smooth and could form streamline, especially for the jet orifice so as to make the air move smoothly and reduce the attrition. For the sake of forming the eddy current more easily of the mixture gas in the air cylinder, batter post 8 can be installed at the bottom of it. On the inner wall of the air cylinder could form a screw thread whose rotating direction is opposite to heading rotating direction of the eddy cyclone. The depth and width of the screw thread are determined by the size of the air cylinder. And the best heading angle of the screw thread is 55.62°. Reverse screw aggravates the descending of the rotating speed at the periphery area of the eddy cyclone. It increases the relative speed of the central eddy cyclone and forms a compression wave between the cylinder wall and the eddy cyclone. Therefore, the energy comes from the eddy cyclone and the cylinder wall could be better isolated, the cylinder wall is protected and reduces the attrition of it. If the screw thread is canceled, the air cylinder's function is not affected much. However, it increases the temperature of the cylinder wall and the burning loss. Moreover, it increases the energy loss through the cylinder wall which results in the descending of the flywheel engine's thermal efficiency. Meanwhile, the descending rotating speed is reduced which is from the central of the eddy cyclone to the periphery area. The rotating speed of the eddy cyclone is reduced relatively, and then it influences the air jet speed of the air cylinder and the realization of the engine's high speed rotating and finally the performance of the flywheel engine as a whole. Outer wall of the air cylinder can install screw thread or cooling plate for better heat output.

Batter post 8 which is at the top of combustion chamber 11 can regular the rotating of the central of eddy cyclone and in favor for the forming of eddy current. The surface of batter post 8 can set a screw thread whose rotating direction is identical to the heading rotating direction of the eddy cyclone. The effect of batter post 8 is not essential because without it eddy current can also form as usual. So, it cannot be set to simplify the structure.

Air cylinder can be made from various cylinder materials. Under normal circumstances, general cylinder materials could be used. The cylinder body could form by the foundry technique in one piece. And high temperature resistant ceramic cylinder can be used and the service life is greatly improved, this kind cylinder is made of ceramic materials by baking once only. If the engine requirement is high, the external part of the cylinder body could be wrapped up by metal or carbon fiber and other materials with high strength to strengthen the intensity of the cylinder body. Put a pail-like ring to fix the air cylinder is possible. The pail-like ring also makes of materials with high strength. Set foundation beds 9 at the top and the bottom and the one at the bottom is fastened tightly to flywheel 15. The air cylinder can also be casted to foundation bed 9 when casting. The pail-like ring is the foundation bed of flame lighter 10 when installing the flame lighter 10 on ceramic air cylinder. In order to strengthen the tightness of the air cylinder and flywheel 15 to improve the air cylinder's intensity, the air cylinder and flywheel 15 can be casted together, or gas mixture room 4, air cylinder, flywheel 15 can be casted as a whole. This could be made by ceramic materials by baking once only for ceramic air cylinder's service life is longer.

For a better usage of the force, the end of the air cylinder's vent will align with the edge of flywheel 15. For fear of the edge's burning loss of flywheel 15 because of the high temperature gas jetted by the air cylinder, the part influences by the high temperature gas will be throw off, a gap is formed at the edge of flywheel 15.

Styles of the present invention are various. The most common ones are the first air cylinder 13, the second 14, the third 19 and etc. In the inner chamber of the first air cylinder 13, the axle wire is an arc. If the vent port of the first air cylinder 13 and the flywheel 15 are in a straight line, the radian of the axle wire in the inner chamber of the first air cylinder 13 could be the same with the edge's radian of flywheel 15. According to the particular case, the two arc edges of the first air cylinder 13 could be equal or differ to each other. However, if the inner arc edge is shorter, energy and torque force could be easily used and improved. The angle between the cord that links the two vent ends of the two arc edges and the tangential line of flywheel 15 is Φ3, 55.62° is chosen as the best. Radians of the axle wire in the inner chamber of the first air cylinder 13 are various. Adjust the jet angle of the first air cylinder 13 when installing and form a certain angle of inclination between it and the radius of flywheel 15. In this way, centrifugal force can be defused easily for better use of counterforce created by the jet thrust of the high pressure gas in the air cylinder. Further more, high speed rotating can also perform more effectively. Function changes of the engine can be realized if you reverse the first air cylinder 13 while the top central axis of it is the axle center which means adjust the angle of the jet direction and the plane that perpendiculars to the flywheel shaft 3 where flywheel 15 belongs could achieve the changes.

The axle wire in the inner chamber of the second air cylinder 14 is a bending line. Take the angle of combustion chamber 11 and the jet position as the cross point and constitutes the bending line structure of the central axis in the air cylinder's inner chamber. Therefore, the central axis in the air cylinder's inner chamber begins to bending at the jet position of combustion chamber 11. Subject to the central axis of jet chamber 12's inner chamber, the central axis of the inner chamber of combustion chamber 11 parallels to radius of flywheel 15, then a certain angle of inclination can be formed between them. Function changes of the engine can be realized if you reverse the second air cylinder 14 while the top central axis of it is the axle center which means adjust the angle of the jet direction and the plane that perpendiculars to the flywheel shaft 3 where flywheel 15 belongs could achieve the changes. This program is in favor of the formation of the eddy current in the air cylinder. At the same time, it could help flywheel 15 to defuse the centrifugal force while make use of counterforce created by the jet thrust. It simplifies the installation and lowers the cost, but the effect is not so good to the first air cylinder 13.

The axle wire in the inner chamber of the second air cylinder 14 is a straight line and makes the air cylinder a straight column. The fabrication technology is relatively simple but the effect is the worst. It goes against the formation of the eddy current in the air cylinder and simple installation. Moreover, it relatively complicates the installation structure when the engine can output torque force and thrust force.

The air cylinder has various geometries. It can be a linear-shaped barrel structure, a slightly contract jet exhaust structure, a distended opening nozzle divergence structure or a linear-shaped barrel structure at the top and the jet position re-distended structure. Set up a chamber the top of combustion chamber 11 where can produce eddy current, between the chamber and combustion chamber 11 is a contracted admitting port of combustion chamber. This kind of structure can decrease the backfire but the effect is not obvious. All these structures count against the sustained combustion and the formation of the eddy current in the air cylinder.

Area of jet exhaust should be smaller than area of admittance port so as to increase the pressure of combustion chamber 11. But when it is too small, backfire will produced, the pressure difference between combustion chamber 11 and the outside will be increased, the energy usage ratio is decreased and energy is consumed. So, the proportion of jet exhaust and admittance port should be chosen according to different demands. If the jet exhaust area is larger than the admitting port area, fire will be hard to ignite and not in favor of the sustained combustion or even can not ignite a fire at all. When the two areas are equal to each other, ignite a fire a harder and the sustained combustion can be realized basically, but the pressure in the air cylinder is affected. In sum, the best one is when the jet exhaust area is smaller than the admitting port area. The engine of the present invention needs high rotating speed to ignite a fire and keep the sustained combustion. In order to adjust the scale of the jet exhaust, the scale of the jet exhaust area and the admitting port area of the ramjet engine should be referred as a reference and could be a bit larger than it. The eddy current in the air cylinder is doing rotation-advancement movement which can hold the flow in the air cylinder for a longer time and for better sustained combustion. The best scale range of the admitting port area and the jet exhaust area is between 1:0.618-1:1. The best scale range of the admitting port and combustion chamber 11's largest cross-sectional area is between 0.382-0.618:1. When the admitting port area is larger than jet exhaust area of combustion chamber 11, install the cigarette handing of flame lighter 10 at the nearby of combustion chamber 11's jet exhaust. This could make the ignition much easier and avoid the backfire when igniting. Flame lighter 10 is ordinary sparking plug.

When the end of the jet exhaust of air cylinder and flywheel 15 in a straight line is the best. The length of the inner chamber central axis of the air cylinder could be 0.618 times of the radius of flywheel 15. The length of the inner chamber cross-sectional diameter and the inner chamber central axis of the air cylinder and jet chamber 12 could be both 0.382 times of the inner chamber central axis of the air cylinder. Under these conditions, the scale of the air cylinder and flywheel 15 is the most proportional, so does the thickness and length of the air cylinder itself. Without changing of the air cylinder's length, put the jet exhaust end of the air cylinder and flywheel 15 and increase or contract flywheel 15's radius, the flywheel engine can also rotate but the compatibility and function will be decreased. Different scales can be chosen according to different demands which including: the inner chamber central axis of the air cylinder and the radius of flywheel 15, the largest inner chamber cross-sectional diameter and the inner chamber central axis of the air cylinder, the inner chamber central axis of the jet chamber 12 and the whole length of the inner chamber central axis of the air cylinder. The inner chamber central axis is a curve and different scales of the lengths of angles of bend's the two sides could be chosen. The best is the golden section.

The engine can rotate when the angle of inclination between the jet direction of the air cylinder and flywheel 15 is greater than zero. The angle of the jet direction of chamber 12's and the radius of flywheel 15 is Φ1 whose best range is between 55.62° to 68.76°. This installation can overcome a part of the centrifugal force to reduce the majority of the huge centrifugal force produced by the high rotating speed of the flywheel engine. High speed rotating can be come true and don't worry about the separation of the flywheel engine by the centrifugal force and reduce the material demands of flywheel 15. Adjust the angle of the jet direction of the air cylinder and flywheel 15 to improve the adaptive capacity of the engine to the rotating speed.

Change the spray angle that constitutes by the jet direction of the air cylinder and the radius of flywheel 15 and the plane that perpendiculars to the flywheel shaft 3 where the flywheel 15 belongs can change the function of the engine. If the jet direction of the air cylinder parallels to the plane that perpendiculars to the flywheel shaft 3 where the flywheel 15 belongs, only torque force can be delivered. When he jet direction of the air cylinder and the plane that perpendiculars to the flywheel shaft 3 where the flywheel 15 belongs is an angle of inclination, the engine can delivery both torque force and thrust force. Adjust the angle of the jet direction of the air cylinder and the radius of flywheel 15 and the plane that perpendiculars to the flywheel shaft 3 can change the functions of the engine. The jet direction of the air cylinder is influenced by the inner chamber central axis of the jet position and is basically parallels to it. The jet direction can be adjusted while subjects to the inner chamber central axis of the jet position when installing.

Guaranteed the formation of the eddy current, the admittance port is set up at the tangential direction of the inner chamber cross section of the air cylinder. Inlet pipe 18 is set up and opens to the top of combustion chamber 11 along the cross section of the air cylinder and it is continent for the air rush into the air cylinder along tangent. Forms of the admittance port's cross section are various which includes circular, square, triangle, polygon, arc polygon and irregular type. Rectangle is the best because the long margin is parallels to the central axis of the air cylinder and is in favor of the formation of the eddy current. Meanwhile, the inner chamber of inlet pipe 18 is gradually expanding to the direction of gas mixture room 4, and increases the entering air's pressure.

The open end direction of inlet pipe 18 and the rotating direction of flywheel 15 when the engine works are at equi-directional. This is the best for the easy entrance of the air because the heading rotating speed of the gas in gas mixture room 4 is lower of the heading speed of wall of gas mixture room 4. This point could be shown obviously when the engine's rotating speed is faster. This could be used up to let the entrance air in along the inner chamber of the cross section of the air cylinder, to promote the formation of the eddy current while using the inertial impact force, to increase the rotating speed of the eddy current in the air cylinder. The higher the rotating speed flywheel 15 has, the easier the eddy current forms. Furthermore, increase the rotating speed of the eddy current in the air cylinder.

Set the open direction of inlet pipe 18 towards to the rotating direction of the flywheel engine when it works and at the same time leans to gas mixture room 4. The open should be on the side wall of gas mixture room 4 and the angle of inclination should be as narrow as it possible to make the inlet pipe 18 smooth. A streamline is formed and the flow can enter the air cylinder easily and smoothly. Expend the open of inlet pipe 18 could help the air to enter the inlet pipe 18 more easily and can avoid the backfire much better.

Flame lighter 10 on the air cylinder connects the ignition system. The ignition system contains the electrical source, power switch, high voltage transformer, electrocircuit and etc. Electric generator can be set on electrical source and will be derived by the engine to generate electricity so as to charge the battery jar of the electrical source. External power source can be used directly and can leave out equipment such as the electric generator, the battery jar and so on. Parts of the ignition system are integrated in the flame igniter. Flame igniter can be installed on flywheel shaft 3 and is connect with the flame lighter 10. The igniting circuit connects the external igniting circuit via the electric brush on the flywheel shaft 3 after passes the central area of flywheel 15. Between the electric brush and flywheel shaft 3 is the insulating links. The high-tension line which connects the electrical brush links the flame lighter 10 in every air cylinder along the flywheel shaft 3 until it reaches the surface of flywheel 15 and then extends to the edge of flywheel 15 along the radius of it. The other end of the high-tension line is set up on the clutch which is controlled by the electromagnet. Two electric brushes constitute the clutch electric brush. Power-down and power turn-on of the electromagnet decide the on and off of the electrical brush. Clutch electrical brush can avoid the attrition of the electrical brush when the flywheel engine is high speed rotating. The flame igniter can not use the clutch electrical brush. After the clutch is cancelled, a certain interval between the two electrical brushes is produced and separation electrical brush is formed. High tension electricity is used to breakdown the interval of the two electrical brushes so as to process the circuit. This can also avoid the friction of the two electrical brushes and simplify the installation of them. Axostyle can be set up at the center of the flywheel and fix the electrical brush on the axostyle. But effect of the program is not perfect and is seldom used. In order to simplify the installation and avoid a series questions such as the damage of the high-tension circuit, the high-tension and brush gear can be cancelled. Just install one or more electrodes and preferably a circuit of high pressure electrodes at the upward side of flywheel 15 which is near the position of flame lighter 10. Ignition will be realized easily when the electrode connects with the igniting circuit. Interstar connection of flame lighter 10 should be installed near the electrode but a certain interval will be existed in which the high tension electricity breakdown to connect the circuit. While flywheel 15 is rotating, flame lighter 10 on the air cylinder will move to the under-side of the electrode and connect with high tension electricity to light a fire. This is the best program to ignite of the flywheel engine.

Ignition system can also not the flame igniter said above. It can be made as miniature flame igniters and install them on the air cylinder directly. But this requires advanced techniques with high costs and is not better than the program said above.

The cranking system contains electric power source, power switch, starter, starting engine and etc. When using the flywheel engine, the cranking system equipment is needed to start and acquire the initial rotating speed. The most common used startup equipment is installed on flywheel shaft 3 directly and gets help from the external electricity to drive the rotating of flywheel shaft 3, thus provides the initial rotating speed of the flywheel engine. The cranking system can also link the starting dynamo at the outside of the flywheel engine. Under this situation, the connection of the starting dynamo and flywheel shaft 3 provides the initial rotating speed of the flywheel engine.

Equipments of the ignition system and the cranking system can manufactured together for the sake of saving the cost and simplifying the structure, namely install the ignition-and-startup device 1 on flywheel shaft 3. Start the ignition-and-startup device 1 and get help from the external electricity to rotate flywheel 15. The fuel and the air enter the gas mixture room 4 through air vents 2, the mixed gas which contains fuel after mixing enters the air cylinder via the jet exhaust and the admittance port for the centrifugal force generated by flywheel 15. For the efforts of the centrifugal force, the mixed gas forms high speed and high pressure eddy current. Flame lighter 10 is controlled by the ignition-and-startup device to light the mixed gas, then the gas expends and exhausts airflow to drive flywheel 15 to rotate. Afterwards, close the start function of the ignition-and-startup device 1 to realize the high speed rotating of itself and output force. Meanwhile, close the igniting circuit to avoid the burning loss of flame lighter 10.

In order to improve the intensity of the whole system and strengthen the force to the resist the centrifugal force mounting plate 7 can be installed which opens at the center of it and will not block the air entrance of gas mixture room 4. Its edge will reach the top and cover on the air cylinder, fasten together mounting plate 7 and foundation bed 9 which is set up on the upward side if the air cylinder. This can greatly improve the intensity and not affect the abstraction of heat. Increase the height of gas mixture room 4 when manufacturing and fasten the edge of the air inlet louver and mounting plate 7 together for further profit of increasing the intensity. Add the backing plate to mounting plate 7 can further increase the intensity. The backing plate and mounting plate 7 can be produced as a whole which means to connect the backing plate and flywheel 15. This makes things integrated and the whole equipment will be more firmly.

The structure of the first embodiment of the present invention is: install air cylinder at the peripheral region of flywheel 15, upper admittance port 6 is set on an superior wall located at a bottom portion of the air cylinder, while under part jet exhaust 5 is set on a inferior wall located at the peripheral region of gas mixture room 4, upper admittance port 6 is connected with under part jet exhaust 5. The monolithic structure of the embodiment is firm and can fasten gas mixture room 4 and flywheel 15 together. The high integrated intensity can better realize the high speed rotating of the engine. In order to increase the integrated intensity, a raised boss 17 can be created on the surface of flywheel 15 then install gas mixture room 4 above boss 17 and make the edge of gas mixture room 4 cover the admittance port of the air cylinder. Make the opening of inlet pipe 18 on the air cylinder lean towards to the upward side of flywheel 15's surface and opens to gas mixture room 4. Fasten gas mixture room 4 and flywheel at the air cylinder and enlarge the edge of gas mixture room 4 to form a special fastened rib plate. Cover it on the air cylinder, then connect it with the backing plate, then fasten the backing plate and flywheel 15 together to hold the air cylinder tightly between gas mixture room 4 and flywheel 15. Tend the backing plate should be thickened and could be manufactured as a whole and can be manufactured with gas mixture room 4 as a whole. This structure can increase the intensity of the flywheel engine and can better overcome centrifugal force.

Structure of the second embodiment is: set gas mixture room 4 at the center of flywheel 15, under part admittance port 61 is set on an inferior wall located at a bottom portion of the air cylinder, while upper jet exhaust 51 is set on a superior wall located at the periphery of the gas mixture room 4, then connect under part admittance port 61 and upper jet exhaust 51. The installation of this embodiment is quite simple.

Structure of the third embodiment is: open lateral jet exhaust 52 on the side wall of gas mixture room 4 and open lateral admittance port 62 at the bottom's lateral surface of the air cylinder. According to the demand of the rotating speed of flywheel 15, set admittance port at the plus side or the reversal side at the bottom of the air cylinder. This installation is relatively more complex and the effect is not ideal. Inlet pipe 18 parallels to the surface of flywheel 15 and twistingly opens to gas mixture room 4. In order to further improve the inlet pressure, the inner cavity of inlet pipe 18 is gradually enlarged and opened to the direction of gas mixture room 4. The defect of this embodiment is inlet pipe employs part of the space which brings about the reduction of air cylinders' installation. Therefore, the effect is not ideal either.

In order to improve the force supplies by the flywheel engine and save the cost, gas mixture room 4 is installed at the upper and lower side of the flywheel 15. Air cylinders are installed at the upper and lower side of flywheel engine respectively. Gas mixture rooms 4 at the two sides of flywheel 15 correspond to the installed fuel system. Regarding to the two-sided flywheel, another structure can also be used in which the two-sided air cylinder share the same gas mixture room 4. The specific structure is: install upper air cylinder 40 and under part air cylinder 16 at the upper and lower side of flywheel 15, set under part admittance port 61 on an inferior wall located at a bottom of upper air cylinder 40, set upper admittance port 6 on a superior wall located at a bottom of under part air cylinder 16, install gas mixture room 4 at the center of flywheel 15, open upper jet exhaust 51 and under part jet exhaust 5 on the superior and inferior walls at the peripheral region of gas mixture room 4, connect under part admittance port 61 and upper jet exhaust 51 so as well the upper admittance port 6 and under part jet exhaust 5.

In order to increase the force supplied by the flywheel engine, several flywheels 15 can be installed on one flywheel shaft 3. The structure of it is the same to that of the single flywheel 15's. A fixed mount is installed on the upper side of every flywheel to fix fuel pipe 20. The fixed mounts are suspended above flywheel 15 and cannot contact with it. This structure is quite suiting the large engines.

On the fundamental of the basically program said above, relative settings and accessories can be added and adjusted to save space, perfect and adjust the functions of the engine. The engine can be installed on every equipment that needs force directly via flywheel shaft 3. The present engine can determine the installation scheme and the engine's size according to the specific statements, horizontal, vertical, inverted and sided installations are all suitable to it.

The flywheel engine of the present invention can output force. Install thrust force air cylinder 36 on flywheel 15, then the jet direction of thrust force air cylinder 36 and the plane of flywheel 15 which is perpendicular to flywheel shaft 3 forms the included angle $\Phi 2$, $\Phi 2$ is a non-zero angle. When the angle is too large, it will block the rotating speed of the flywheel engine. When the rotating speed of the engine requires the smaller angle, greater thrust force will be outputted. The best value of $\Phi 2$ is 34.38°. The smaller of the angle, the easier the rotating speed increased. And the screw propelling jet blast can possess much faster rotating speed, and then its thrust force and the propelling speed will be much greater and faster. Thrust force air cylinder 36 can be the first air cylinder 13 or the second air cylinder 14, just reverse a certain angle of them while take the top central axis of the air cylinder as the axle center. Then, an angle greater than zero can be formed of the jet direction of the first air cylinder 13 or the second air cylinder 14 and the plane of flywheel 15 which is perpendicular to flywheel shaft 3. The thrust force air cylinder can be the third air cylinder 19 when the jet direction and the jet angle are adjusted. But its installation is much troublesome and the effect is not ideal.

Flywheel shaft 3 of the flywheel engine which can both output torque force and thrust force can be installed on the aerocraft directly. Flywheel shaft 3 generates different thrust force or pulling force to the aerocraft at the different sides of the flywheel. When flywheel shaft 3 and the screw propelling jet are on the same surface of flywheel 15, which means the angle between the jet direction of the air cylinder and flywheel shaft 3 is less than 90°, the pulling force to the aerocraft is generated. When flywheel shaft 3 and the screw propelling jet are on the different surfaces of flywheel 15, which means the angle between the jet direction of the air cylinder and flywheel shaft 3 is more than 90°, the thrust force to the aerocraft is generated.

The flywheel engines which can output both torque force and thrust force are suitable to various aeronautics and astronautics devices including the rocket, the airplane and the spaceship. The flow it jetted is an eddy cyclone flow which rotating speed is descending from the center to the peripheral region and the frontal surface of the vortex flow forms a taper type with the conical tip is rotating in a high speed. Just like the rotating bullet, the vortex flow's screw propelling possesses much faster speed and greater thrust force. It at the same time reduces the noisy. As long as flywheel 15 and the bearing can bear, the faster the engine rotates the higher capacity factor the engine will have.

The specific structure of the flywheel engine which can both output torque force and thrust force is: install thrust force air cylinder 36 and gas mixture room 4 on flywheel 15. Set up admittance port on thrust force air cylinder 36 and jet exhaust on gas mixture room 4, and then connect the admittance port and the jet exhaust. The jet direction of thrust force air cylinder 36 is leaning towards to the lower inclined side of flywheel 15. Thrust force air cylinder 36 and the plane of flywheel 15 which is perpendicular to flywheel shaft 3 forms a non-zero angle and the best angle is 34.38°. Thrust force air cylinder 36 and the radius of the flywheel forms an included anger which is greater than zero and the best angle of it is between 55.62° and 68.76°.

In order to increase the thrust force of the flywheel engine, thrust force air cylinder 36 can be installed on the two surfaces of the flywheel. In order to enhance the effect of temperature reduction, air box 37 can be installed at the under part of flywheel 15 and set air box jet exhaust 38 at the sided wall of the air box, siphunculus 41 is set at the inside of flywheel shaft 3 and is connected with air box 37, then flywheel shaft admittance port 39 is set on the superior axial wall of flywheel shaft 3. When it is used, the flywheel engine can rotate high-speedily and the air enters siphunculus 41 via flywheel shaft admittance port 39 and then enters air box 37, and finally is threw away via air box jet exhaust 38. Therefore, the temperature of the components around can be reduced. The air inlet and exhaust systems of the flywheel engine which can output torque force and thrust force are generally adopt the method of transmitting the gas directly. Namely, make shell 23 a ringent tube-shape, then the air can enter and exhaust the flywheel engine directly.

In order to increase the thrust force of the flywheel engine to output thrust force, superimposed multi-flywheels can be used. But air box 37 must be installed between the flywheels and then just install siphunculus 41, fuel pipe 20, gas pipe 22 and other accessories in the flywheel shaft. Every air box 37 should connect with siphunculus 41 respectively, and fuel pipe 20 and gas pipe 22 can be combined together to supply the fuel and air to every gas mixture room 4.

In order to realize the high-speed rotating of the engine and possess wider power value of the engine and to resolve the difficult problem such as the bearing can not stand the high-speed rotating of flywheel shaft 3, the bearing on flywheel shaft 3 can be cancelled. Thus, the high speed rotating of flywheel shaft 3 will be changed to the low rotate speed of the three stable axes around. Geared speed change or gearless speed change can be used as long as it can hold flywheel shaft 3 among the three stable axis and at the same time endwise slip of flywheel shaft 3 willed not be produced. The following method can be adopted: install wheel box 35 under shell 23, pour lubricant in wheel box 35 directly. In wheel box 35, install the first gear 25 and the second gear 26 at the output terminal of flywheel 3 with a certain distance, install the first stable axis 32, the second stable axis 34 and the third stable axis 27 evenly beside flywheel shaft 3. The included angles of the three are all 120°. Install the first stable gear 33, the second stable gear 31 and the first driver gear 30 on the first stable axis 32 respectively. Mesh the first stable gear 33 and the first gear 25, the second stable gear 31 and the second gear 26, the first driver gear 30 and the second driver gear 29 and connect the second driver gear 29 and power take-off shaft 28. In order to avoid flywheel shaft sliding along the axial direction, set the tapered inclined plane at the upper side of the first stable gear 33 and the under part of the second stable gear 31. The same gears on the first stable shaft 32 can also be set up on the second stable shaft 34 and the third stable shaft 27. The smaller of the ratio of the diameter of the gear and the diameter of the stable gear on flywheel shaft 3, the easier and faster the engine can rotate.

While using the engine of the present invention, the ignition starting device 1 should be first started to rotate flywheel 15 of the engine. When flywheel 15 rotates to a certain speed, the air will be sucked into the air inlet louver 2 automatically from gas pipe 22, fuel pipe 20 will be started to transport the fuel to admittance port 2, then the fuel and the air will be sucked into gas mixture room 4 automatically. The mixed gas in gas mixture room 4 automatically forms an eddy cyclone whose rotating speed is increasing from the center to the peripheral region. Then the gas pressure at the edge of gas mixture room 4 will be increased to mix the gas and the fuel more well-distributed. Under the effort of the centrifugal force, the fuel-air mixture enters combustion chamber 11 and forms an eddy cyclone whose rotating speed is descending from the center to the peripheral region. Start a fire by flame lighter 10 which is controlled by the ignition starting device 1 to start the burning, the eddy cyclone prolongs the time of the fuel's stay in combustion room 4. So, the fuel and the air can be mixed more well-distributed and guaranteed the fully combustion of the fuel. Once the eddy cyclone forms in combustion room 11, an eddy can be formed in combustion room 4 and the fuel-air mixture can entirely enters the center of the eddy cyclone via the eddy. Heat released by the combustion of the constant adding fuel can greater increase the rotating speed of the center of the eddy cyclone. Therefore, the descending of the rotating speed from the center to the peripheral region is intensified and the relative rotating speed at the center of the eddy cyclone is greatly increased, then more energy can be gathered at the center of the eddy cyclone to create a high temperature and high pressure environment at the center area of combustion chamber 11.

High pressure gas is excluded from jet chamber 12 and formed a thrust force to drive flywheel 15 to rotate. An eddy cyclone can be formed at the edge of flywheel 15 whose rotating speed is descending from the center to the peripheral region, and at the same time the noise of the engine is greatly reduced. As the whole engine works it is operated with neither the roar nor the shock or vibration of the engine. Once the flame is ignited, the boost from the external force can be cancelled to realize the high speed rotating by itself and output the force. Meanwhile, close the igniting electric power source of the ignition starting device 1.

In order to realize a better ignition, the electrode gaps of flame lighter 10 can be enlarged, and at the same time increase the electric tension. With the help of the external force, firstly start the engine until is reaches a certain rotating speed, then start the igniting circuit and supply the ignition fuel to it. When double fuel engine is used, ordinary fuel should be supplied to it until the engine is ignited. Flame-out of an engine can be realized after all fuel supplies are stopped. The idle speed control and the rotating speed of the flywheel engine should be changed synchronously. Accelerator of the idle speed should be correspondingly enlarged when the rotating speed is high. When the accelerator of the idle speed is too small, the fuel concentration of the mixed gas will be too low because of the air input is enlarged when the rotating speed is too high, and finally occurs the flameout of the engine. Therefore, the size of the accelerator of the idle speed should be adjusted according to the changes of the rotating speed of the engine by the idle speed control devices. The rotating speed of the engine is too high, for the security of the engine itself the superior limit of its rotating speed should be controlled.

Various fuels can be used for the flywheel engine of the present invention including all kinds of fluid fuels and solid fuels. When the fuel which is hard to ignite by flame lighter 10 is used, the fuels which can be ignited easily should be used first and all kinds of fuels can be used after the flywheel engine is started. A variety of fuels can be compound use. However, when the solid fuel is used, the solid fuel should be crashed to granules with a certain size and they should be as slim as possible. If the fluid fuel such as the gas or liquid fuel is used, deliver directly the fuel to the air inlet louver 2 at the gas mixture room 4 via fuel pipe 20. When the solid fuel such as the fire coal is used, it should be crashed to powder and then deliver the powder by the high velocity gas flow to the air inlet louver 2 at the gas mixture room 4 via fuel pipe 20. The flow can enter the air inlet louver 2 with the coal dust after preheats by the waste heat, and the usage ratio can be increased by doing so. According to the demand, to fuel pipes 20 can be installed at the same time. One of them is used to deliver the fuel which can be easily ignited to ignite a fire when igniting and the other is used to deliver ordinary fuels such as the diesel fuel, coal powder and etc. under the normal condition of burning to reduce the cost of the fuel. If take the coal powder as the fuel can solve the oil crisis, the rotating speed of the energy can be controlled by the control the flow capacity of the coal powder. The water-coal-slurry can also be burnt in the present invention, this method can solve the oil crisis but it is not economical than using the coal powder directly. It is more economical when the fire coal is used as the fuel than the oil which can greatly reduce the cost of the fuel, and is especially suitable to the large power equipment such as the steamship, the train, heavy load truck and so on.

In order to reduce the charges of the hazardous materials in gases when the coal is used as the fuel of the engine, several purification methods can be adopted. For example, well-distributed add a certain scale of limestone powder to the coal dust or the coal paste, desulphurization reactions can accurately react at the center of the eddy current of the air cylinder and in the eddy cyclone at the peripheral region of the engine. Devices to treat the waste gas can be installed outside the vent port 24, for example, a draught fan can be installed on the exhaust pipe, and then the draught fan will pressurize the waste gas and is inlets an air proof water chamber to flitter. An exhaust pipe with a certain thickness and height can be installed vertically at the upper water chamber and the thickness and the height are decided by the air displacement. Install several high pressure nozzles at the topmost of the exhaust pipe and connect the nozzles with the water pump which can jet the water through the high pressure nozzles after the water is pressurized in the water tank. The water mist jetted processes a certain angle of inclination downward. At the same time install some domed blades on the inner wall of the exhaust pipe, drops of the water mist collide with each other as they are splashed on the blades to improve the functions of atomization. The water mist can further mix the flour dust which can not precipitate in the water of the waste gases. The direction of motion of the high speed downward movement of the water mist jetted by the high pressure nozzle is opposite to the direction of motion of the waste gases. Then, the flour dust can be dashed with the high speed water mist and the flour dust can be flittered, desulfurization and denitrification reactions will be improved and avoid the wear and tear of the water when the water mist moves downwardly with high speed. The water tank can remove oxygen compounds of sulphur, compounds of nitrogen and oxygen, chloride and other harmful charges. Oxidation reaction in the air cylinder is fully and the contents of nitric oxide in the compounds of nitrogen and oxygen generated by the engine are low. Therefore, the water tank can readily realize desulfurization and denitration. The flour dust can react and generate plenty of nitrate, nitrite, sulphate, sulphite and so on. So, the scale of limestone in the fuel can be properly enlarged to make the react more fully. Finally, add water to the water tank at regular intervals and at the same time eliminate the sediments in it. They can be handled in the bunkering station by uniform process, and recycle and deal with the sediments for they are good chemical raw materials. The water tank, the exhaust pipe and the blade in the exhaust pipe should be produced by anti-rot materials.

The flywheel engine can be used for thermal power generation. It can improve the security of production, reduce the energy consumption, decrease the noise pollution, lower down the discharges of pollution, reduce the expense of the found of the factory, save the water resource, and can open and close the air crew randomly to reduce the cost of purification. If the scale of the engine is enlarged, every kind of fuel can be used, even the garbage can be dealt with the combustion process. As long as the garbage is crashed, they can be used with the fuel together. The present of the invention can also be used for thermal power generation. Moreover, install the electric power unit at the electric unit. The electric power unit can be chosen according the demands while various fuels can be used, network loss can be reduced, the generating cost can be decreased and all charges of the building and operation of power networks can be saved.

The present invention can be used in material industry and is regarded as the thermal equipment such as the new type furnace, the liquation furnace, the reborner, the calcinatory and so on. It can create the high temperature and high pressure environment, and prompt all kinds of materials to generate various high temperature-physics reaction and high-temperature chemical reaction and produce different materials. Materials that need baking can be prepared to powder or slurry state. Raw materials can be delivered by the flow or magma pump while they are pressurized. A funnel can be directly set up at mouth of the admittance port of the engine and transport the raw materials to the engine straightforwardly. A threaded rod which is derived by the electric motor can be set up in the funnel, and then the materials can drip evenly. Once the eddy cyclone formed in combustion chamber 11 of the air cylinder, an eddy can be formed at the inflow point of combustion chamber 11. Then fuel mixed gases and the materials which need baking can entirely enter the center of the eddy cyclone, and a high temperature and high pressure environment will be produced at the center area of the eddy cyclone of the air cylinder. All materials will realize the high-temperature reaction in the area, and a series of complex physical and chemical reaction will occur such as crystallization. Increase the rotating speed of the flywheel engine and enlarge the supply volume of the materials can increase the temperature and pressure of high temperature and high pressure environment of combustion chamber 11, and then a super high temperature and high pressure environment to create conditions which can produce all kinds of new materials.

The present invention can produce many a material, such as the cement, ceramic frit, alumina, artificial stones and so on. Prepare the shell of the engine to the storage hopper and install the engine above it. Set up the bottom of the storage hopper to a funnel form or set up a conveyer to output the products. In order to make good use of the thermal energy, set up jet exhaust on the side wall at the under part of the storage hopper, then set up tail gas clean-up devices at the admittance port. So the gas pipe can enter from the bottom of the storage hopper. After collect the after heat, gases enter the engine via the heat collection patches.

When manufacturing cement, ceramic frit, alumina and other materials, the raw materials can be prepared to powdery or pulpous state, and deliver them to the engine directly. The fuel could be coal or other different fuels. The methods of manufacturing other materials are basically largely identical but with minor differences. The only thing to do is to adjust the measurement and the rotating speed of the engine according to the demands. The dynamo is also able to be installed on the engine, which is used to stable the rotating speed of the engine and at the same time to generate electricity for the sake of improving the efficiencies.

Take the production of the artificial stone for example, excess powdered carbon can be supplied by batch-type method. When the engine operates normally, the powdered carbon can be crystallized under the circumstance of the high temperature and high pressure environment at the center of the eddy current in the air cylinder and artificial stone will be generates. Furthermore, increase the size of the engine can create even larger artificial stones. The oxygen content in the storage hopper should also be controlled simultaneously, screen 21 is close to air inlet louver 2 of the engine, and the interval between them is small to let seldom gas enter the storage hopper. However, the cooling of the air cylinder can adopt atomized water spray, just install the water mist nozzle at the upward side of the flywheel. After elutriation and filter, the diamond can be sifted from the materials that come out from the storage hopper. The leftovers can be baked again after dehydration and enter the engine once more, the dehydrated water can be used recycling. In order to improve the neatness of the diamond, the water mist which is used to cool the air cylinder should be the pure water for the best. For the purpose of generating better diamond, hydrogen is used as the fuel. Supply sufficient hydrogen until the scale between oxygen and hydrogen reaches the saturated reaction. Then, hydrogen is more active than carbon, so it can take effort of the reduction reaction and reduce the reactions between carbon and oxygen.

Technical schemes of the present invention are not limited in the extent of the embodiments said above. The contents of the technology which are not presented with detailed descriptions are publicly known technology.

What is claimed is:

1. A flywheel engine comprising:
   a shell (23), an ignition system, a cranking system and a fuel system; wherein
   a flywheel shaft (3) installed on the shell (23), and at least a flywheel (15) being installed thereon;
   a gas mixture room (4) set up on the flywheel (15) having an open air inlet louver (2) at the central part thereof;
   a plurality of air cylinders installed at a peripheral region of the flywheel (15) and a jet exhaust opened at a peripheral region of the gas mixture room (4);
   an admittance port set up at a bottom of each air cylinder and the jet exhaust is connected therein;
   an install flame lighter (10) set in the air cylinder;
   an angle between a jet direction of a jet chamber (12) of the air cylinder and a horizontal radius of the flywheel (15) is $\Phi 1$;
   a cross section of the air cylinder has a circular form, an install inlet pipe (18) is in the admittance port, one end of the install inlet pipe (18) opens to a direction of rotation of the flywheel, other end towards to a tangential direction of the cross section of the air cylinder, a combustion chamber (11) and the jet chamber (12) are in the air cylinder, a diameter of a cross section of the air admittance position of jet chamber (12) is smaller than a largest diameter of a cross section of the combustion chamber (11).

2. The flywheel engine according to claim 1, wherein the air cylinder is a first air cylinder (13), a central axis of an inner chamber of the first air cylinder is of an arc.

3. The flywheel engine according to claim 1, wherein the air cylinder is a second air cylinder (14), a central axis of an inner chamber of the second air cylinder (14) is a curve.

4. The flywheel engine according to any one of claim 1, 2 or 3, wherein the admittance port is an upper admittance port (6) set on a superior wall located at a bottom portion of the air cylinder, the jet exhaust is an under part jet exhaust (5) set on an inferior wall located at a peripheral region of the gas mixture room (4), the upper admittance port (6) is connected with the under part jet exhaust (5).

5. The flywheel engine according to any one of claim 1, 2 or 3, wherein the admittance port is an under part admittance port (61) set on an inferior wall located at a bottom portion of the air cylinder, the jet exhaust is an upper jet exhaust (51) set on a superior wall located at a peripheral region of the gas mixture room, the under part admittance port (61) is connected with the upper jet exhaust (51).

6. The flywheel engine according to any claim 1, 2 or 3, wherein a lateral jet exhaust (52) is set on a side wall of the gas mixture room (4) and a lateral admittance port (62) is set on a lateral wall located a bottom portion of the air cylinder, the lateral jet exhaust (52) is connected with the lateral admittance port (62).

7. The flywheel engine according to any one of claim 1, 2 or 3, wherein the gas mixture room (4) is installed at upper side and lower side of the flywheel (15), air cylinders are installed at upper and lower side of the flywheel (15) respectively.

8. The flywheel engine according to any one of claim 1, 2 or 3, wherein an upper air cylinder (40) and an under part air cylinder (16) is installed at the upper and lower sides of flywheel (15) respectively, an under part admittance port (61) is on an inferior wall located at the bottom portion of the upper air cylinder (40), an upper admittance port (6) is on the superior wall located at a bottom portion of the under part air cylinder (16), the gas mixture room (4) is at the center of flywheel (15), an upper jet exhaust (51) and an under part jet exhaust (5) at the superior and inferior walls located at a peripheral region of the gas mixture room (4), the under part admittance port (61) and the upper jet exhaust (51) are connected with each other and the upper admittance port (6) and under part jet exhaust (5) are connected with each other.

9. The flywheel engine according to claim 1, wherein the air cylinder is a thrust force air cylinder (36), an inclination between a jet direction of the thrust force air cylinder (36) and a plane of the flywheel (15) which is perpendicular to flywheel shaft (3) is angle Φ2.

* * * * *